US010699553B2

(12) United States Patent
Lee

(10) Patent No.: US 10,699,553 B2
(45) Date of Patent: Jun. 30, 2020

(54) PREVENTIVE MAINTENANCE METHOD OF DRIVING DEVICE

(71) Applicants: ITS CO., LTD., Ulsan (KR); Youngkyu Lee, Ulsan (KR)

(72) Inventor: Youngkyu Lee, Ulsan (KR)

(73) Assignees: ITS CO., LTD., Ulsan (KR); Youngkyu Lee, Ulsan (KR)

( * ) Notice: Subject to any disclaimer, the term of this patent is extended or adjusted under 35 U.S.C. 154(b) by 0 days.

(21) Appl. No.: 16/389,678

(22) Filed: Apr. 19, 2019

(65) Prior Publication Data

US 2019/0304287 A1    Oct. 3, 2019

Related U.S. Application Data

(63) Continuation of application No. PCT/KR2018/004458, filed on Apr. 17, 2018.

(30) Foreign Application Priority Data

Aug. 11, 2017 (KR) .................. 10-2017-0102632

(51) Int. Cl.
*G08B 21/18* (2006.01)
*G08B 21/02* (2006.01)
*G05B 23/02* (2006.01)
*G06Q 10/04* (2012.01)
*G06Q 50/04* (2012.01)

(52) U.S. Cl.
CPC .......... *G08B 21/187* (2013.01); *G05B 23/02* (2013.01); *G06Q 10/04* (2013.01); *G06Q 50/04* (2013.01); *G08B 21/02* (2013.01); *G08B 21/18* (2013.01)

(58) Field of Classification Search
CPC ........ G05B 23/02; G06Q 10/04; G06Q 50/04; G08B 21/02; G08B 21/18; G08B 21/182; G08B 21/187
See application file for complete search history.

(56) References Cited

U.S. PATENT DOCUMENTS 9,279,715 B2 * 3/2016 Hedin ................. G01M 13/045
2003/0130811 A1 * 7/2003 Boerhout .............. G01H 1/003
702/56

FOREIGN PATENT DOCUMENTS

| JP | 2003-280707 A | 5/2006 |
| KR | 10-0856301 B | 9/2008 |
| KR | 10-2014-0081928 A | 7/2014 |

(Continued)

*Primary Examiner* — Quan-Zhen Wang
*Assistant Examiner* — Rajsheed O Black-Childress
(74) *Attorney, Agent, or Firm* — Studebaker & Brackett PC

(57) ABSTRACT

The present invention includes: collecting information about a change in energy magnitude according to time measured with the driving device in normal operation separately for each of a peak period and a mean period; collecting information about a change in energy magnitude according to time measured with the driving device in operation before the driving device breaks separately for each of the peak period and the mean period; setting a peak fault of the peak period on the basis of the information collected; and collecting information about a change in energy magnitude according to time measured in real time with the driving device in operation separately for each of the peak period and the mean period and of detecting the driving device in an abnormal state when the collected energy values in the peak period exceed the peak fault of the peak period set in the setting.

8 Claims, 11 Drawing Sheets

(56) References Cited

FOREIGN PATENT DOCUMENTS

| KR | 10-2015-0074258 A | 7/2015 |
|----|-------------------|--------|
| KR | 10-1643599 B | 7/2016 |

* cited by examiner

PREVENTIVE MAINTENANCE METHOD OF DRIVING DEVICE

CROSS-REFERENCE TO RELATED APPLICATIONS

The present application is a continuation of International Patent Application No. PCT/KR2018/004458, filed Apr. 17, 2018, which is based upon and claims the benefit of priority to Korean Patent Application No. 10-2017-0102632, filed on Aug. 11, 2017. The disclosures of the above-listed applications are hereby incorporated by reference herein in their entirety.

TECHNICAL FIELD

The present invention relates to a preventive maintenance method of a driving device and, more particularly, a preventive maintenance method of a driving device, the method being able to prevent an enormous loss due to a breakdown of a driving device by collecting operation information of the driving device in a normal state and operation information of the driving device before a breakdown occurs, setting a fault and a warning in each of a peak period and a mean period on the basis of the collected information, and by comparing operation information collected in real time when the driving device is driven with the faults and the warnings in the peak period and the mean period to be able to repair and replace the driving device at appropriate time by giving a warning when a condition arising suspicion of abnormal symptoms of the driving device is satisfied.

BACKGROUND ART

In general, stable operation is very important for driving devices (a motor, a pump, a conveyer, a compressor, etc.) that are used for automated processes of facilities.

For example, hundreds of driving devices are installed and continuously convey materials to convey while driving in association with each other at a large-scale conveying factory, in which if any one of the driving device breaks, a severe situation that the entire facility is stopped may occur.

Down-time due to a breakdown of a driving device unavoidably causes a considerable loss due to not only a cost of repairing the driving device, but also operational expenses and business effects that are wasted while the facility is stopped.

According to data from Korean Ministry of Employment and Labor and Korean Occupational Safety & Health Agency, a total of around hundred thousand people are killed or wounded every year due to industrial safety accidents and the casualties are converted into yearly loss of 18 trillion won in expenses.

It is urgent to introduce a preventive maintenance system as a measure for avoiding such unexpected down-time costs. There have been efforts to solve this problem under the name of preventive maintenance, but it is required develop a higher level of preventive maintenance method for more efficient preventive maintenance.

Technical Problem

The present invention has been made in an effort to solve the problems described above and an object of the present invention is to provide a preventive maintenance method of a driving device, the method being able to prevent an enormous loss due to a breakdown of a driving device by collecting operation information of the driving device in a normal state and operation information of the driving device before a breakdown occurs, setting a fault and a warning in each of a peak period and a mean period on the basis of the collected information, and by comparing operation information collected in real time when the driving device is driven with the faults and the warnings in the peak period and the mean period to be able to repair and replace the driving device at appropriate time by giving a warning when a condition arising suspicion of abnormal symptoms of the driving device is satisfied.

Another object of the present invention is to provide a preventive maintenance method of a driving device, the method being able to propose various detection conditions for searching for various abnormal symptoms that may be generated in the driving device, to easily detect various abnormal symptoms that are generated in the driving device by warning a user when the detection conditions are satisfied, and to secure excellent reliability on the detection result.

Technical Solution

In order to achieve the objects of the present invention, a preventive maintenance method of a driving device according to the present invention includes: a first base information collection step (S10) of collecting information about a change in energy magnitude according to time measured with the driving device in normal operation separately for each of a peak period and a mean period; a second base information collection step (S20) of collecting information about a change in energy magnitude according to time measured with the driving device in operation before the driving device breaks separately for each of the peak period and the mean period; a setting step (S30) of setting a peak fault of the peak period on the basis of the information collected in the first and second base information collection steps; and a detection step (S40) of collecting information about a change in energy magnitude according to time measured in real time with the driving device in operation separately for each of the peak period and the mean period and of detecting the driving device in an abnormal state when the collected energy values in the peak period exceed the peak fault of the peak period set in the setting step, in which any one of a current that is consumed to drive the driving device, vibration that is generated when the driving device is driven, noise that is generated when the driving device is driven, and the frequency of a power supply source for the driving device is selected and used as the energy that is measured from the driving device, and in the setting step (S30), a period where the driving device starts to be driven is set as an exception period because a large change is generated in energy magnitude when the driving device starts to be driven, and in the detection step (S40), the driving device is recognized as being in a normal state even though the energy value of the driving device exceeds the peak fault in the peak period in the exception period, and the driving device is recognized as being in an abnormal state even though it is the exception period when the energy value of the driving device exceeds the peak fault in the peak period and a peak fault duration is maintained, in which the peak fault duration is set in the setting step (S30).

Further, a peak alarm period of a predetermined time is set in the setting step (S30), and in the detection step (S40), the number of times that the energy value of the driving device in the peak period exceeds the peak fault of the peak period in the set peak alarm period is counted, and when the number of times is sensed over a number of times set in the setting step (S30), the driving device is recognized as being in an abnormal state.

Further, in the setting step (S30), a peak warning of the peak period is set on the basis of the information collected in the first and second base information collection steps, and the driving device is detected as in a warning state when the energy value of the driving device in the peak period exceeds the peak warning in the detection step (S40), when the energy value of the driving device exceeds the peak warning in the exception period, the driving device is detected as being in a normal state, when the energy value of the driving device exceeds the peak warning and a peak warning duration is maintained in the exception period, the driving device is recognized as being in a warning state even though it is the exception period, the peak warning of the peak period is set as a value smaller than the peak fault, and the peak warning duration is set in the setting step.

Further, a mean fault of the mean period is set in the setting step (S30) on the basis of the information collected in the first and second base information collection steps (S10 and S20), in the detection step (S40), when the energy value of the driving device in the mean period exceeds the mean fault of the mean period set in the setting step (S30) and the exceeding energy value of the driving device in the mean period is not maintained for a mean fault duration, the driving device is detected as being in a normal state, but when the energy value of the driving device in the mean period is maintained for the mean fault duration, the driving device is detected as being in an abnormal state, and the mean fault duration is set in the setting step (S30).

Further, a mean warning of the mean period is set in the setting step (S30) on the basis of the information collected in the first and second base information collection steps (S10 and S20), in the detection step (S40), when the energy value of the driving device in the mean period exceeds the mean warning of the mean period set in the setting step (S30) and the exceeding energy value of the driving device in the mean period is not maintained for a mean warning duration, the driving device is detected as being in a normal state, but when the energy value of the driving device in the mean period is maintained for the mean fault duration, the driving device is detected as being in a warning state, and the mean warning of the mean period is set as a value smaller than the mean fault and the mean fault duration is set in the setting step.

Further, when the energy value of the driving device in the peak period exceeds a peak warning of the peak period for a peak warning duration and the energy value in the mean period exceeds the mean warning of the mean period for the mean warning duration in the detection step (S40), the driving device is recognized as being in abnormal state.

Further, an offset value is set in the setting step (S30), a start point is set as a point where the energy values of the driving device in the peak period and the mean period start to exceeding the offset, an end point is set as a point where the energy values start to decreasing under the offset value, a driving period of the driving device is forcibly set as the period from the start point to the end point, driving periods repeated by the driving device that operates while repeating driving and pausing are respectively extracted and collected, average values of change values in energy magnitude of the driving device in the driving periods according to a measurement time in a normal state are extracted on the basis of information of the collected driving periods, and an alarm upper limit and an alarm lower limit are set on the basis of the extracted average values of the changes in energy magnitude of the driving device in the driving periods according to a measurement time, and in the detection step (S40), when a change value of an energy magnitude according to time measured in a real-time driving state of the driving device exceeds the alarm upper limit or is less than the alarm lower limit, the driving device is detected as being in an abnormal state.

Further, a reset time is set in the setting step (S30), and the peak period and the mean period of the driving device are divided into several search periods by cutting the energy values in the peak period and the mean period at every set reset time.

Advantageous Effects

According to the preventive maintenance method of a driving device of the present invention, it is possible to prevent an enormous loss due to a breakdown of a driving device by collecting operation information of the driving device in a normal state and operation information of the driving device before a breakdown occurs, setting a fault and a warning in each of a peak period and a mean period on the basis of the collected information, and by comparing operation information collected in real time when the driving device is driven with the faults and the warnings in the peak period and the mean period to be able to repair and replace the driving device at appropriate time by giving a warning when a condition arising suspicion of abnormal symptoms of the driving device is satisfied.

Further, it is possible to propose various detection conditions for searching for various abnormal symptoms that may be generated in the driving device, to easily detect various abnormal symptoms that are generated in the driving device by warning a user when the detection conditions are satisfied, and to secure excellent reliability on the detection result.

DETAILED DESCRIPTION

A preventive maintenance method of a driving device according to a preferred embodiment of the present invention is described in detail with reference to the accompanying drawings. When functions and configurations of components well known in the art may make the gist of the present invention unclear, a detailed description of the components will be omitted.

Figure 1:
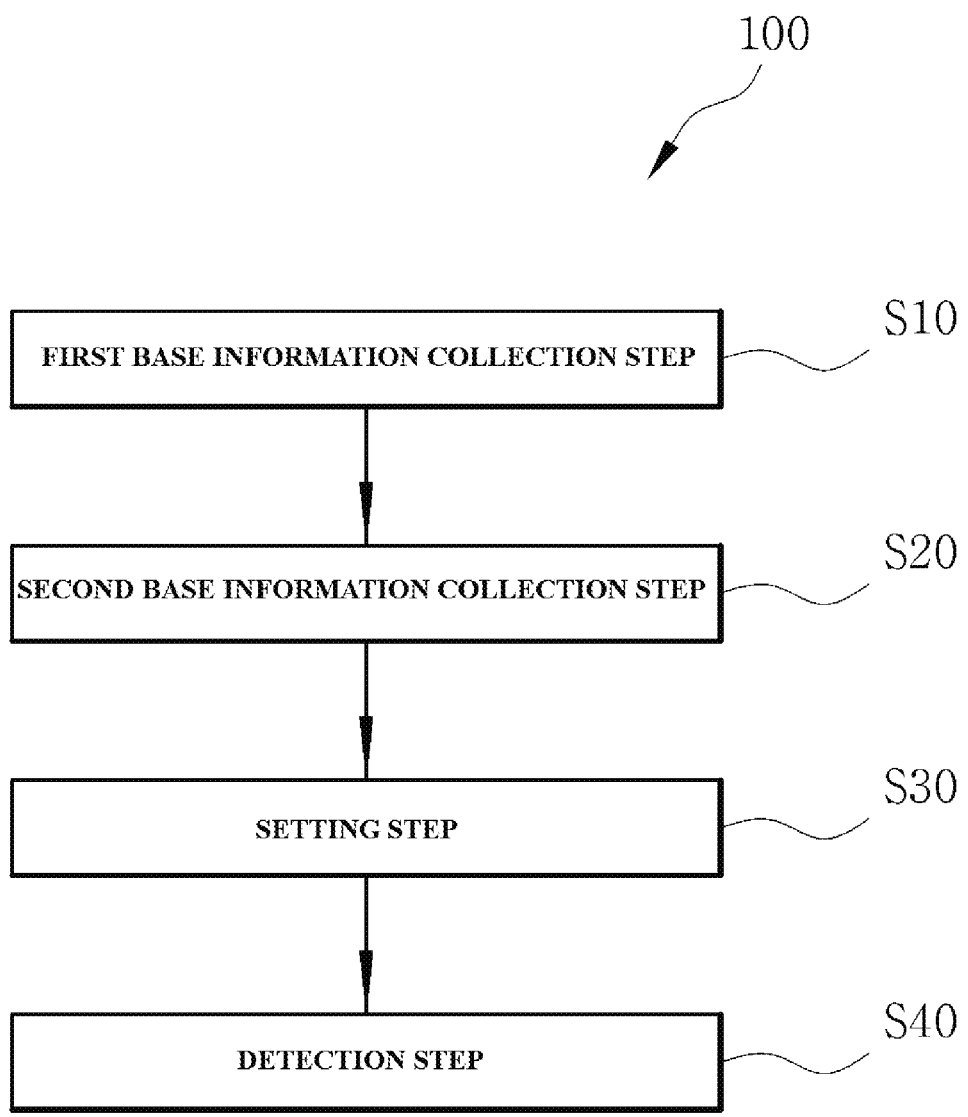
FIG. 1 is a block diagram of a preventive maintenance method of a driving device according to an embodiment of the present invention.

FIG. 1 is a block diagram of a preventive maintenance method of a driving device according to an embodiment of the present invention.

As shown in FIG. 1, a preventive maintenance method 100 of a driving device according to an embodiment of the present invention includes a first base information collection step (S10), a second base information collection step (S20), a setting step (S30), and a detection step (S40).

The first base information collection step (S10) is a step of collecting information about a change in energy magnitude according to time measured with a driving device in normal operation separately for each of a peak period and a mean period.

This collected information forms the foundation of various reference values that are set to detect abnormal symptoms of the driving device in the setting step (S30) and the detection step (S40) to be described below.

In the information about a change in energy magnitude according to time measured with a driving device in normal operation, the peak period means a period in which the energy magnitude is a peak and the mean period means a period in which the driving device is stabilized and an energy value is continuously maintained within a predetermined range.

As the energy that is measured from the driving device, any one of a current that is consumed to drive the driving device, vibration that is generated when the driving device is driven, noise that is generated when the driving device is driven, and the frequency of a power supply source for the driving device is selected and used, but the energy is not limited to these kinds of energy.

The second base information collection step (S20) is a step of collecting information about a change in energy magnitude according to time measured with the driving device in operation before the driving device breaks separately for each of the peak period and the mean period.

This collected information, similar to the information collected in the first base information collection step (S10), also forms the foundation of various reference values that are set to detect abnormal symptoms of the driving device in the setting step (S30) and the detection step (S40).

The setting step (S30) is a step of setting a peak fault of the peak period on the basis of the information collected in the first and second base information collection steps (S10 and S20).

That is, the peak fault of the peak period is set on the basis of the information collected for a long period of time in the first and second base information collection steps (S10 and S20) and on the basis of energy values of the driving device that are abnormally changed in the peak period before the driving device breaks.

The detection step (S40) is a step of collecting information about a change in energy magnitude according to time measured in real time with the driving device in operation separately for each of the peak period and the mean period and of detecting the driving device in an abnormal state when the collected energy values in the peak period exceed the peak fault of the peak period set in the setting step.

Figure 2:
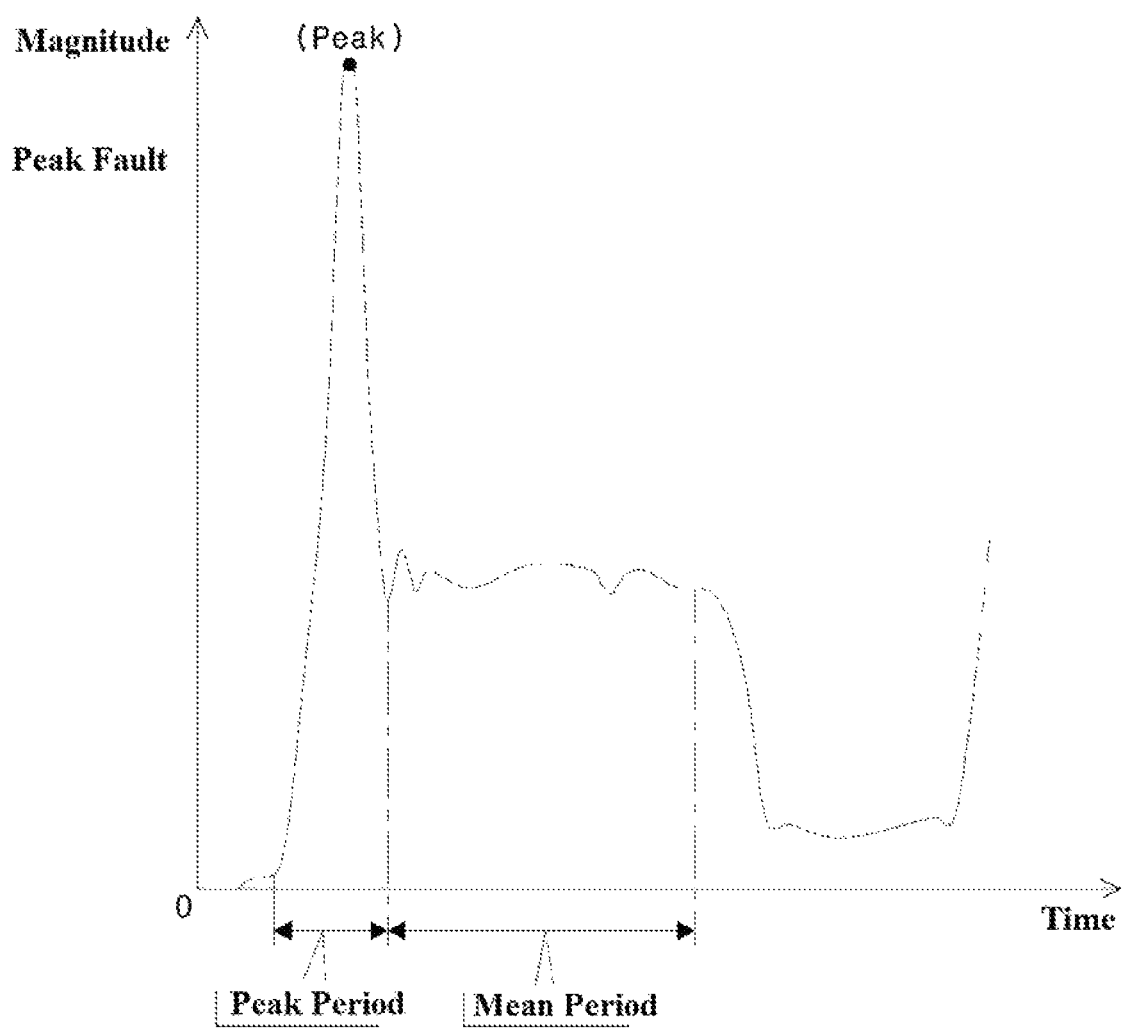
FIG. 2 is a graph illustrating information about a change in energy magnitude according to time measured in real time with a driving device in operation.

FIG. 2 is a graph illustrating information about a change in energy magnitude according to time measured in real time with a driving device in operation.

As shown in FIG. 2, when an energy value in the peak period that changes in the process of driving the driving device exceeds the set peak fault of the peak period, the driving device is detected as being in an abnormal state to be able to prevent an economic loss due to stoppage of a facility by a breakdown of the driving device by performing management such as replacement or repair in advance before the driving device breaks.

Further, the period where the driving device starts to be driven is set as an exception period in the setting step (S30) because a large change is generated in energy magnitude when the driving device starts to be driven.

In the detection step (S40), the driving device is recognized as being in a normal state even though the energy value of the driving device in the peak period exceeds the peak fault in the peak period in the exception period, and the driving device is recognized as being in an abnormal state even though it is the exception period when the energy value of the driving device in the peak period exceeds the peak fault in the peak period and a peak fault duration is maintained, in which the peak fault duration is set in the setting step (S30).

Figure 3:
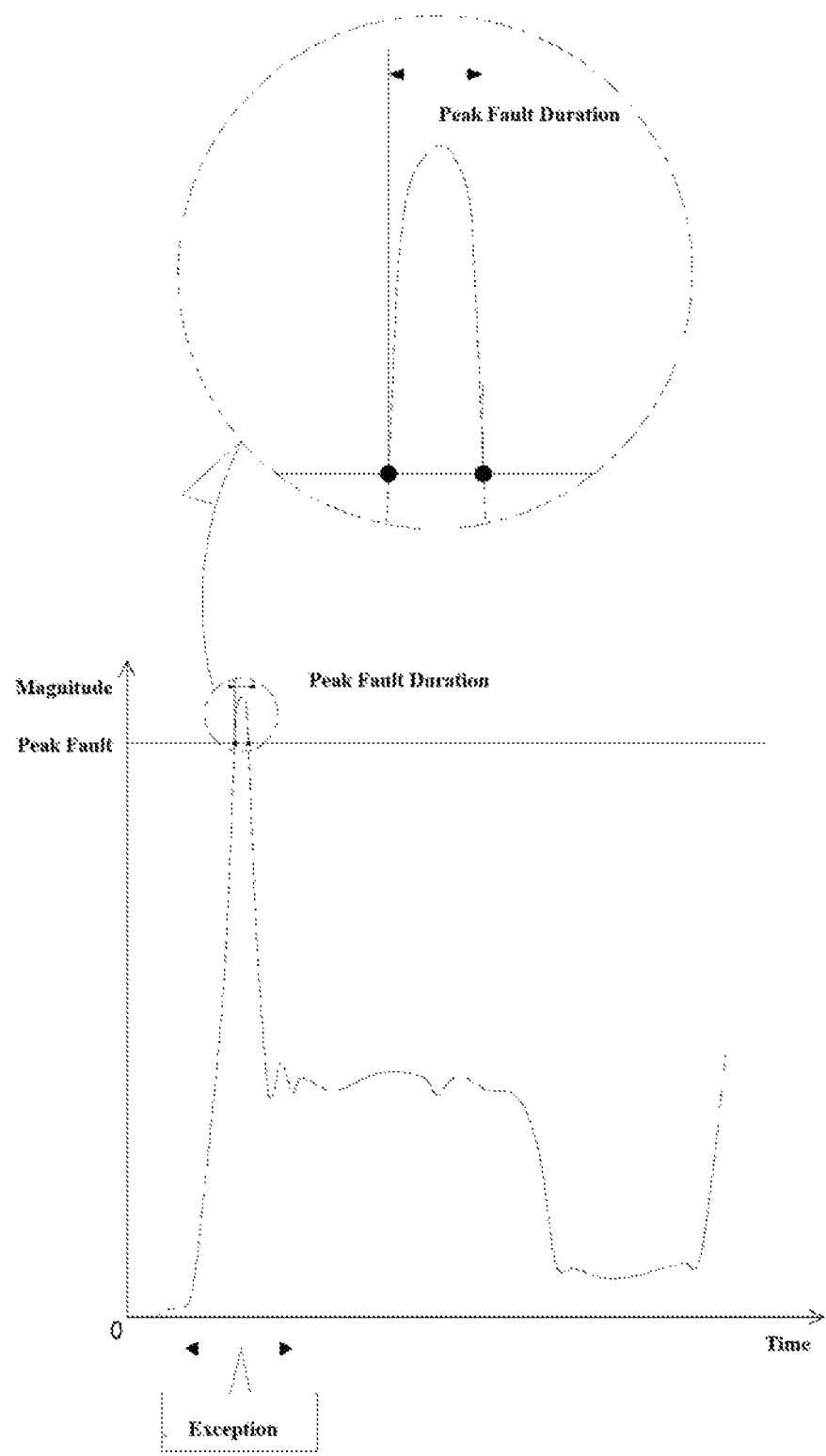
FIG. 3 is a graph illustrating information about a change in energy magnitude according to time measured in real time with a driving device in operation.

FIG. 3 is a graph illustrating information about a change in energy magnitude according to time measured in real time with a driving device in operation.

In general, the energy magnitude of the driving device is large when the driving device starts to be driven. For example, as shown in FIG. 3, assuming that the energy of the driving device is a current that is consumed to operate the driving device, a large amount of current is required to start the driving device and a small amount of current is consumed at a constant level when the driving device is normally driven and reaches the mean period. Obviously, a change in energy corresponds to not only a current, but vibration, noise, and the frequency of a power supply source.

Accordingly, since the energy value of the driving device in the peak period exceeds the peak fault in many cases at the point of time where the driving device starts to be driven, the driving device is recognized as being in a normal state when the energy value of the driving device in the peak period exceeds the peak fault in the exception period.

However, even though it is the exception period, when the energy value of the driving device in the peak period exceeds the peak fault and maintained for a peak fault duration, the driving device is detected (recognized) as being in an abnormal state, in which the peak fault direction is set in the setting step (S30) on the basis of the information collected in the first and second base information collection steps (S10 and S20).

Further, a peak alarm period of a predetermined time is set in the setting step (S30).

In the detection step (S40), the number of times that the energy value of the driving device in the peak period exceeds the peak fault of the peak period in the set peak alarm period is counted, and when the number of times is sensed over a number of times set in the setting step, the driving device is recognized as being in an abnormal state.

Figure 4:
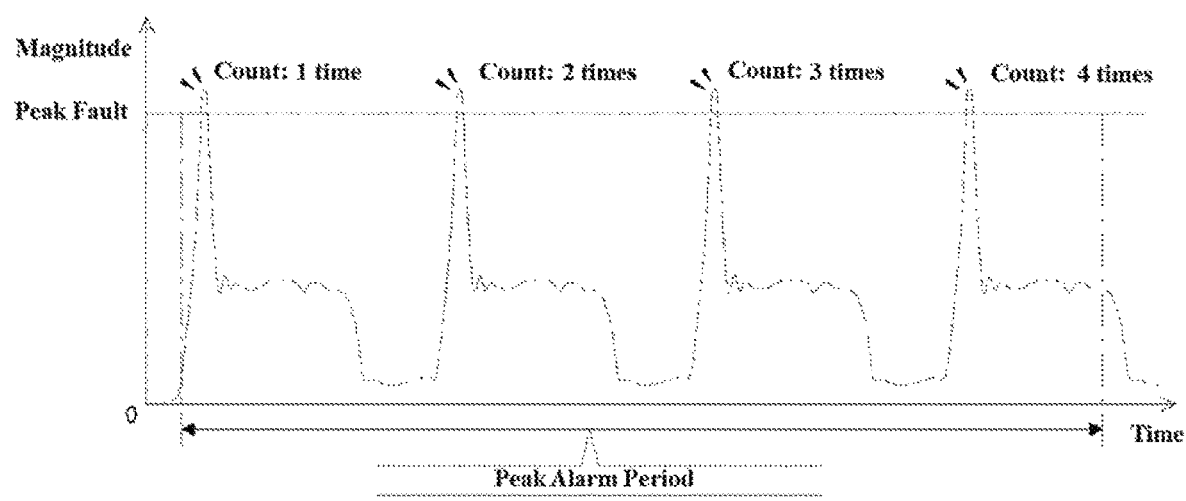
FIG. 4 is a graph illustrating the number of times that energy value of a driving device exceeds peak fault in a set peak alarm period is counted.

FIG. 4 is a graph illustrating the number of times that energy value of a driving device exceeds peak fault in a set peak alarm period is counted.

In the detection step (S40), when the energy value of the driving device in the peak period is counted over the peak fault of the peak period but does not exceed the number of times set within the time of the peak alarm period set in the setting step (S30), the driving device is recognized as being in a normal state; however, as shown in FIG. 4, when the number of times exceeds the number of times set within the limited time of the peak alarm period, the driving device is recognized as being in an abnormal state, whereby precise preventive maintenance is induced for the driving device.

Further, in the setting step (S30), a peak warning of the peak period is set on the basis of the information collected in the first and second base information collection steps (S10 and S20), and the driving device is detected as in a warning state when the energy value of the driving device in the peak period exceeds the peak warning in the detection step (S40).

When the energy value of the driving device in the peak period exceeds the peak warning of the peak period in the exception period, the driving device is detected as being in a normal state.

When the energy value of the driving device in the peak period exceeds the peak warning of the peak period and a peak warning duration is maintained in the exception period, the driving device is recognized as being in a warning state even though it is the exception period.

The peak warning of the peak period is set as a value smaller than the peak fault of the peak period and the peak warning duration is set in the setting step (S30).

That is, as described above, since the magnitude of the energy of the driving device is large at the point of time where the driving device starts to be driven, the energy value of the driving device in the peak period at the point of time where the driving device starts to be driven exceeds the peak warning in many cases, so when the energy value of the driving device in the peak period exceeds the peak warning in the exception period, the driving device is recognized as being in a normal state.

Figure 5:
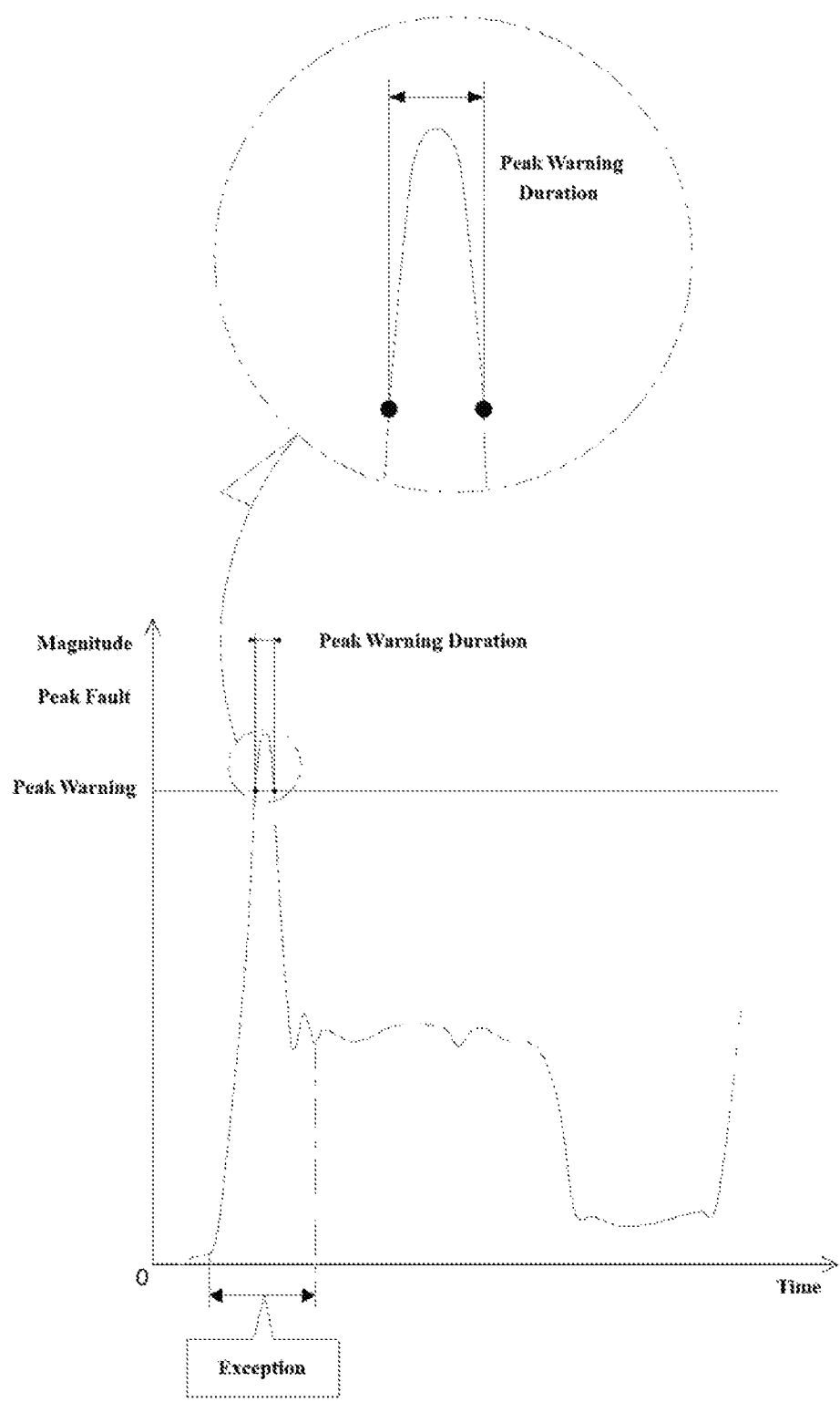
FIG. 5 is a graph illustrating information about a change in energy magnitude according to time measured in real time with a driving device in operation.

FIG. 5 is a graph illustrating information about a change in energy magnitude according to time measured in real time with a driving device in operation.

As shown in FIG. 5, when the energy value of the driving device in the peak period exceeds the peak warning of the peak period and the peak warning duration is maintained, even though it is the exception period, the driving device is detected as being in a warning state, in which the peak warning duration is obviously set in the setting step (S30) on the basis of the information collected in the first and second base information collection steps (S10 and S20).

Further, the peak warning of the peak period is set on the basis of the information collected for a long period of time in the first and second base information collection steps (S10 and S20) and on the basis of energy values of the driving device that are abnormally changed in the peak period before the driving device breaks, in which the peak warning of the peak period is set as a value smaller than the peak fault of the peak period.

Accordingly, when the energy value in the peak period that changes in the process of driving the driving device exceeds the set peak warning, the driving device is detected as being in a warning state, which can be considered as a step in which the driving device is in a dangerous state at a lower level than the case when the energy value exceeds the peak fault of the peak period, so special interest and attention are required for the driving device.

Further, in the setting step (S30), a mean fault of the mean period is set on the basis of the information collected in the first and second base information collection steps (S10 and S20).

In the detection step (S40), when the energy value of the driving device in the mean period exceeds the mean fault of the mean period set in the setting step (S30) and the exceeding energy value of the driving device in the mean period is not maintained for a mean fault duration, the driving device is detected as being in a normal state, but when the energy value of the driving device in the mean period is maintained for the mean fault duration, the driving device is detected as being in an abnormal state, in which the mean fault duration is set in the setting step.

The mean period of the driving device means a period in which the energy value is maintained within a predetermined range for a predetermined time. The range of the energy value or the mean fault duration that determines the mean period is suitably set by a user on the basis of the information collected in the first base information collection step (S10).

Further, the mean fault of the mean period is set on the basis of the information collected for a long period of time in the first and second base information collection steps (S10 and S20) and on the basis of energy values of the driving device that are abnormally changed in the mean period before the driving device breaks.

Figure 6:
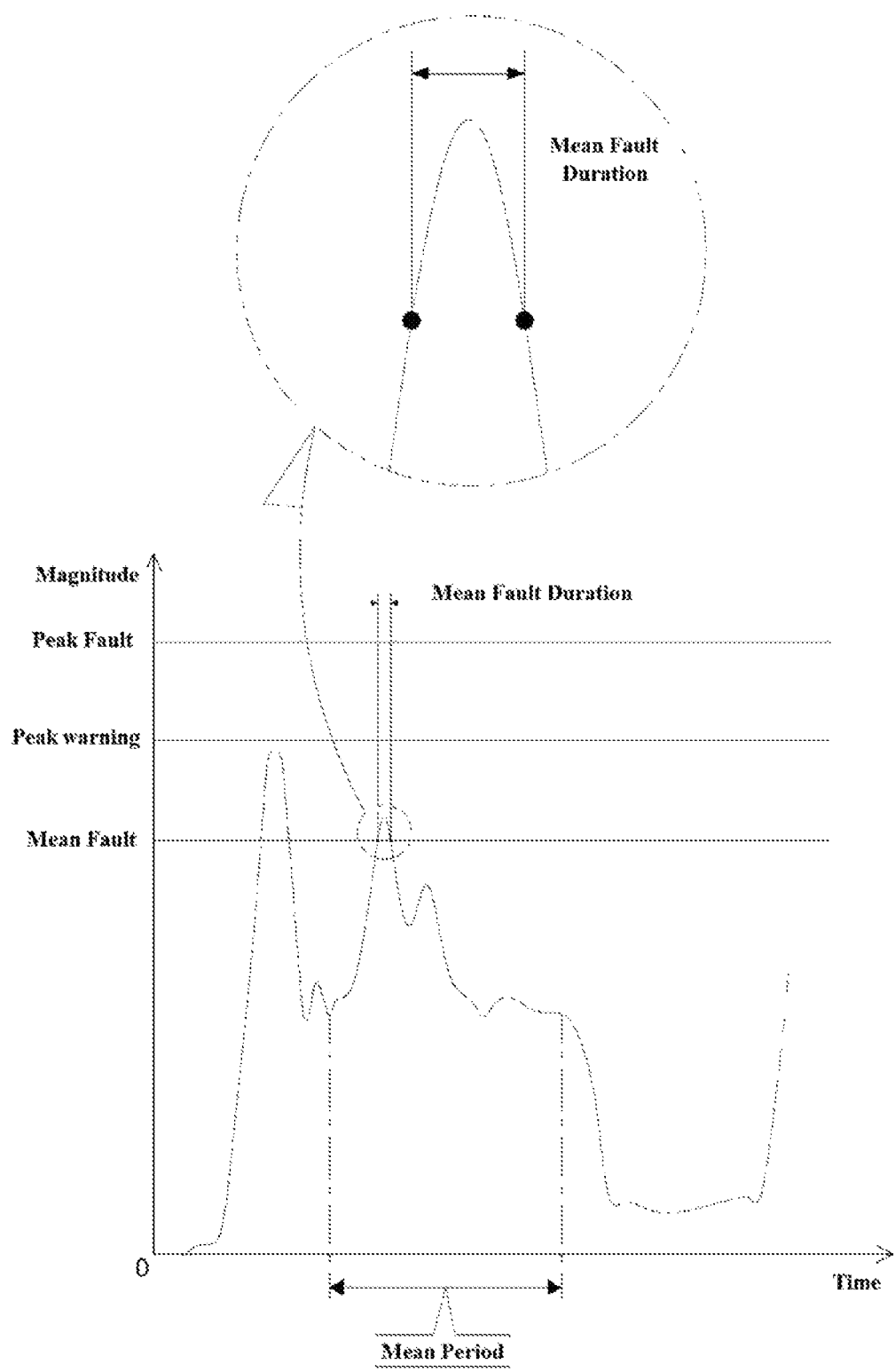
FIG. 6 is a graph illustrating information about a change in energy magnitude according to time measured in real time with a driving device in operation.

FIG. 6 is a graph illustrating information about a change in energy magnitude according to time measured in real time with a driving device in operation.

As shown in FIG. 6, when the energy value of the mean period that changes in the process of driving the driving device exceeds the mean fault of the mean period and is maintained for the mean fault duration, it is recognized as a step in which the driving device is detected as being in an abnormal state and management such as replacement and repair is required before the driving device breaks.

Even if the energy value of the driving device in the mean period exceeds the mean fault of the mean period, when the mean fault duration is not maintained, it is recognized as a case due to temporary load on the driving device or a normal situation such as a case in which the energy value passes the mean fault of the mean period in a process of entering the mean period from the peak period, whereby the driving state is detected as being in a normal state.

The mean fault duration set to recognize the state of the driving device is also set in the setting step (S30) on the basis of the information collected in the first and second base information collection steps (S10 and S20).

Further, a mean warning of the mean period is set in the setting step (S30) on the basis of the information collected in the first and second base information collection steps (S10 and S20), in the detection step (S40), when the energy value of the driving device in the mean period exceeds a mean warning of the mean period set in the setting step (S30) and the exceeding energy value is not maintained for a mean warning period, the driving device is detected as being in a normal state, but when the exceeding energy value of the driving device in the mean period is maintained for the mean warning duration, the driving device is detected as being in warning state.

The mean warning of the mean period is set as a value smaller than the mean fault of the mean period and the mean fault duration is set in the setting step (S30).

The mean warning of the mean period is set on the basis of the information collected for a long period of time in the first and second base information collection steps (S10 and S20) and on the basis of energy values of the driving device that are abnormally changed in the mean period before the driving device breaks, in which the mean warning of the mean period is set as a value smaller than the mean fault of the mean period.

Figure 7:
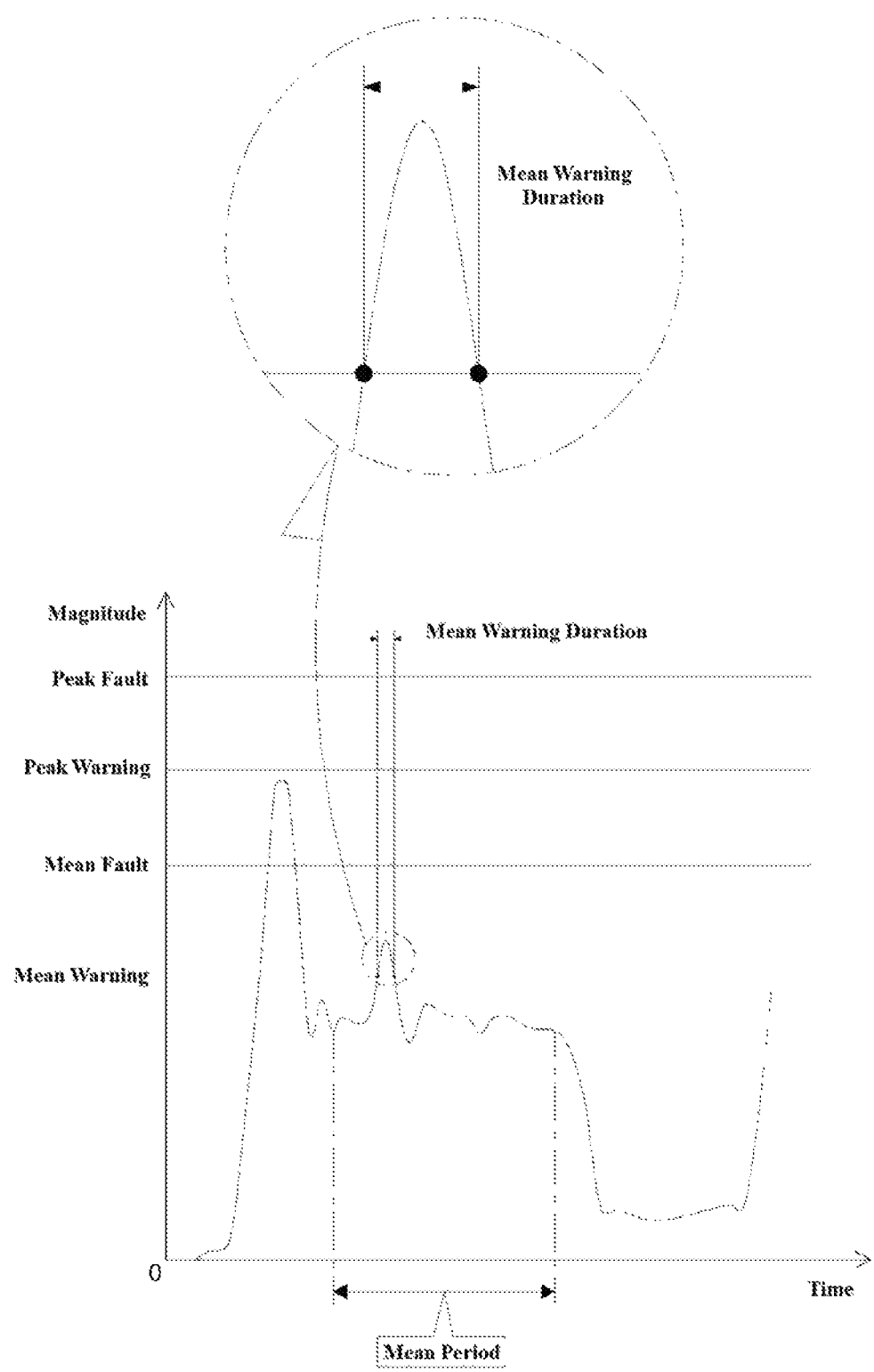
FIG. 7 is a graph illustrating information about a change in energy magnitude according to time measured in real time with a driving device in operation.

FIG. 7 is a graph illustrating information about a change in energy magnitude according to time measured in real time with a driving device in operation.

As shown in FIG. 7, when the energy value in the mean period that changes in the process of driving the driving device exceeds the set peak warning in the mean period and is maintained for the mean fault duration, the driving device is detected as being in a warning state, which can be considered as a step in which the driving device is in a dangerous state at a lower level than the case when the energy value exceeds the mean fault of the mean period, so special interest and attention is required for the driving device.

The mean fault duration set to recognize the state of the driving device is also set in the setting step (S30) on the basis of the information collected in the first and second base information collection steps (S10 and S20).

Further, when the energy value of the driving device in the peak period exceeds a peak warning of the peak period for a peak warning duration and the energy value in the mean period exceeds the mean warning of the mean period for the mean warning duration in the detection step (S40), the driving device is recognized as being in abnormal state.

Figure 8:
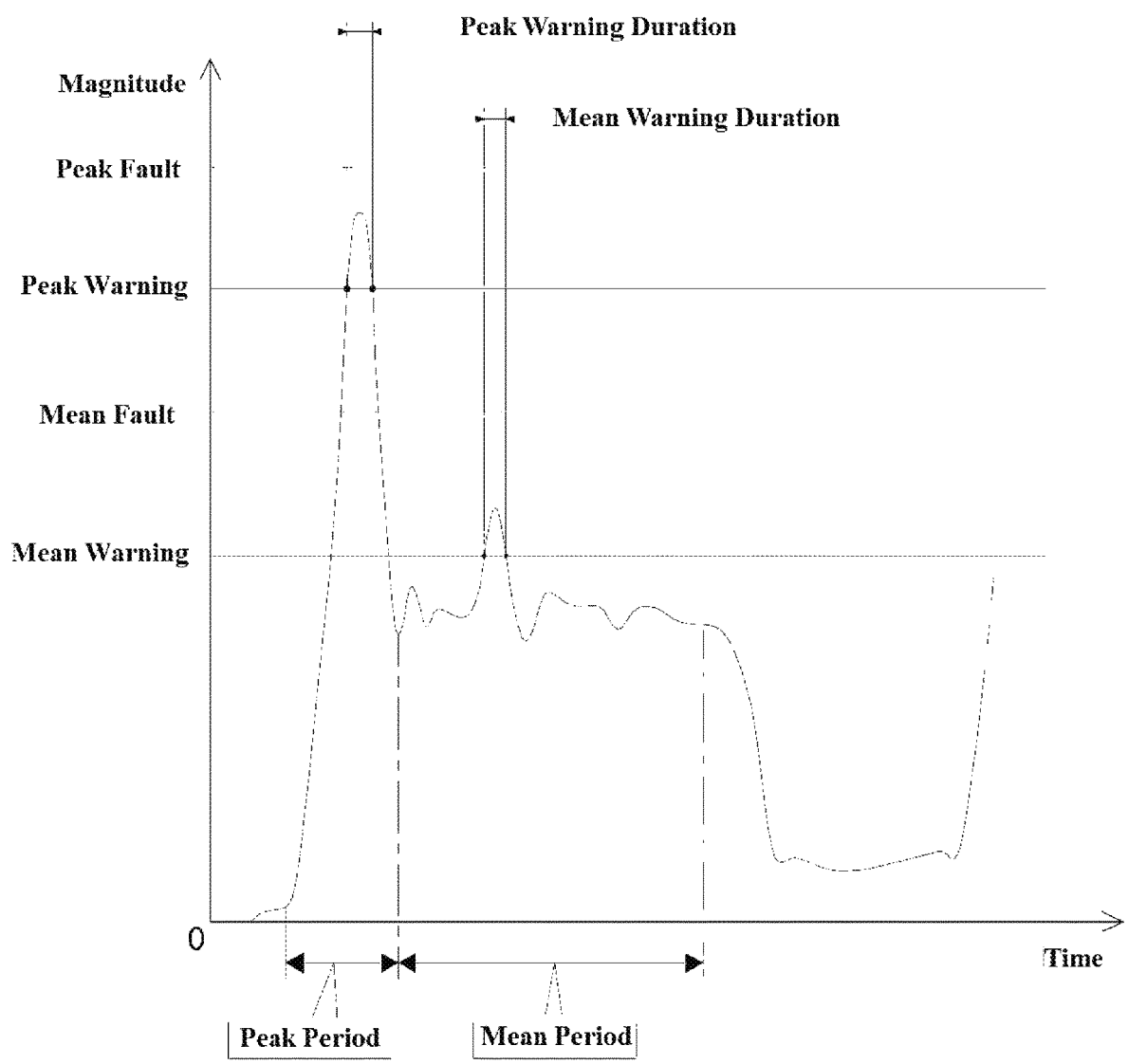
FIG. 8 is a graph illustrating information about a change in energy magnitude according to time measured in real time with a driving device in operation.

FIG. 8 is a graph illustrating information about a change in energy magnitude according to time measured in real time with a driving device in operation.

As shown in FIG. 8, when the energy value of the driving device is detected as being in a warning state in both the peak and mean periods in the detection step (S40), it is preferable to recognize the driving device as being in an abnormal state and perform management such as replacement or repair by testing the driving device because precise management is required for safe operation of the facility even if the driving device is in a warning state.

Further, an offset value is set in the setting step (S30).

A start point is set as a point where the energy values of the driving device in the peak period and the mean period start to exceeding the offset, an end point is set as a point where the energy values start to decreasing under the offset value, a driving period of the driving device is forcibly set as the period from the start point to the end point, driving periods repeated by the driving device that operates while repeating driving and pausing are respectively extracted and collected, average values of change values in energy magnitude of the driving device in the driving periods according to a measurement time in a normal state are extracted on the basis of information of the collected driving periods, and an alarm upper limit and an alarm lower limit are set on the basis of the extracted average values of the changes in energy magnitude of the driving device in the driving periods according to a measurement time.

In the detection step (S40), when a change value of an energy magnitude according to time measured in a real-time driving state of the driving device exceeds the alarm upper limit or is less than the alarm lower limit, the driving device is detected as being in an abnormal state.

Figure 9:
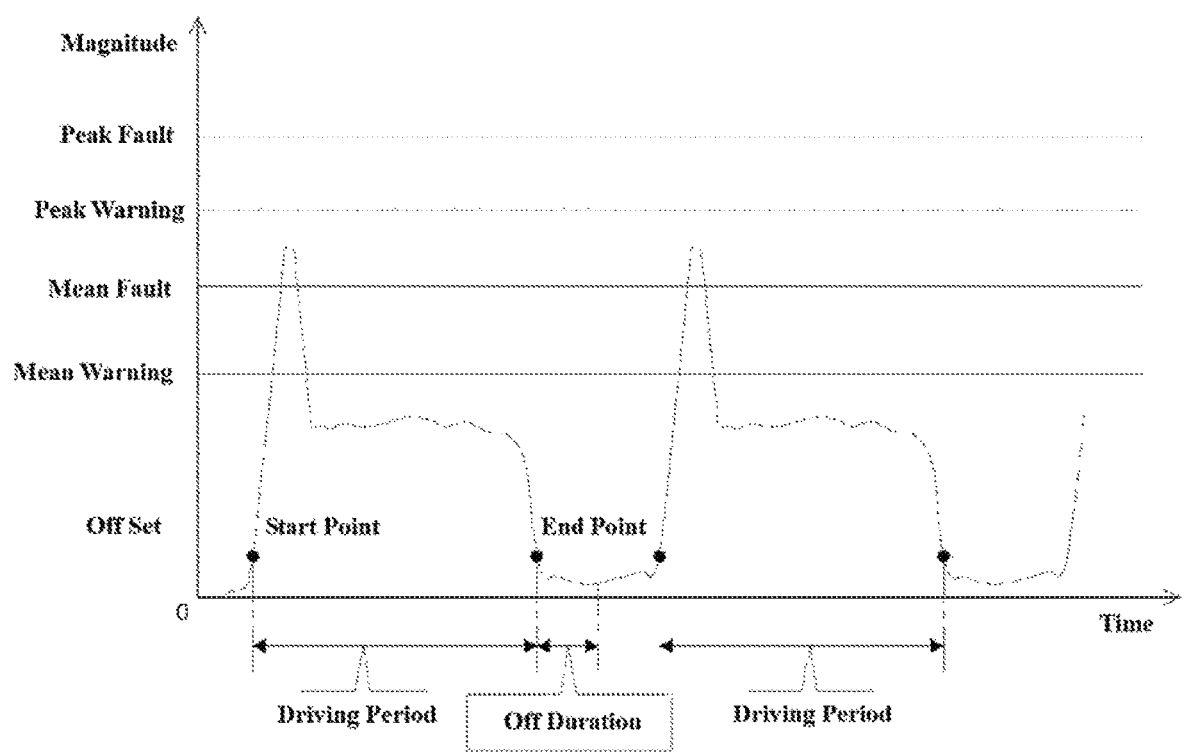
FIG. 9 is a graph illustrating patterns of repeated energy values in driving periods.

FIG. 9 is a graph illustrating patterns of repeated energy values in driving periods.

As shown in FIG. 9, a user can easily extract and acquire repeated driving periods of the driving device by setting the offset value, can more systematically collect, compare, and manage the states (data) of the driving device through the patterns of the repeated energy values in the driving periods, and can more effectively perform preventive maintenance on the driving device on the basis of the data.

Figure 10:
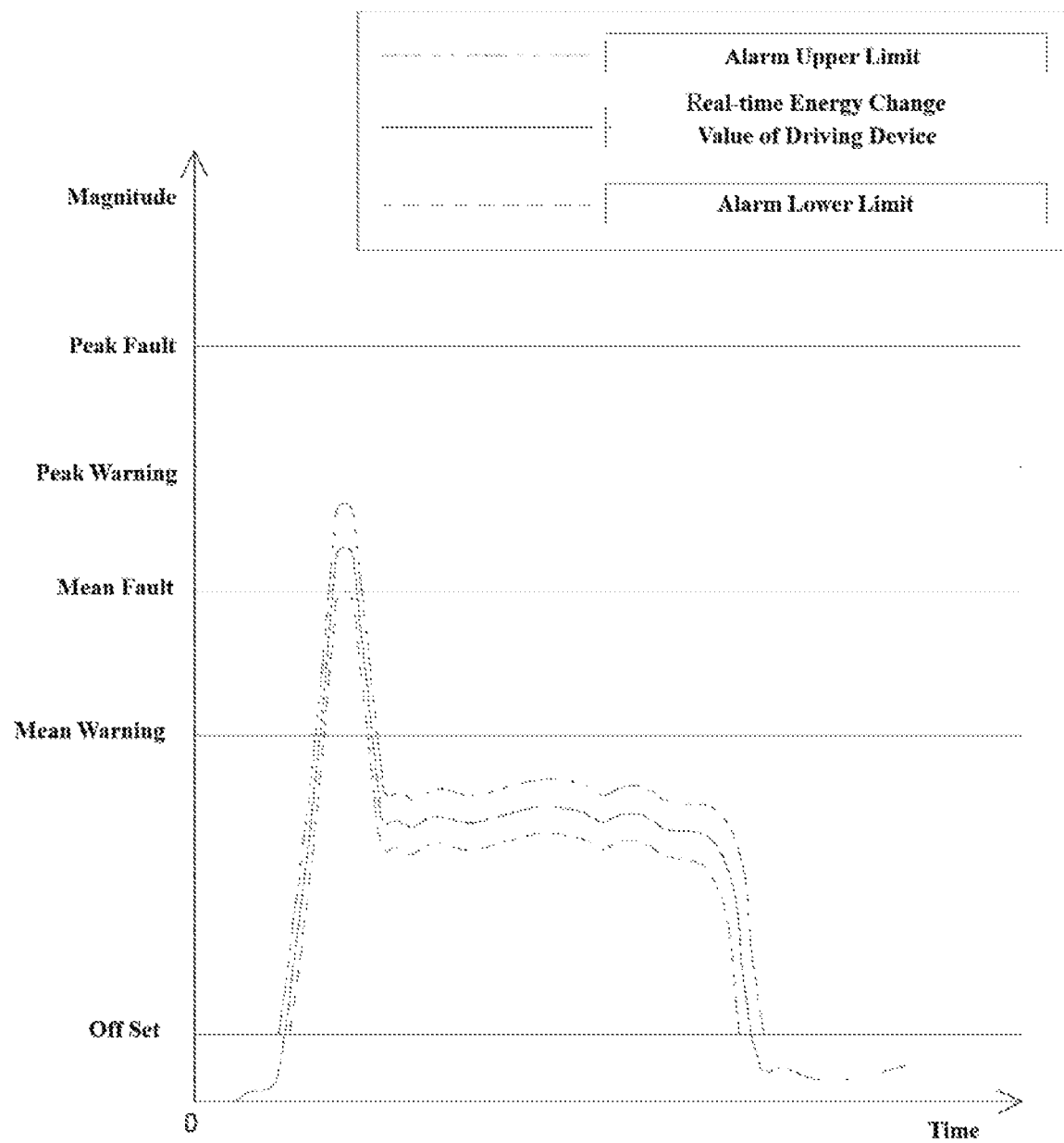
FIG. 10 is a graph illustrating information about a change in energy magnitude according to time measured in real time with a driving device in operation.

FIG. 10 is a graph illustrating information about a change in energy magnitude according to time measured in real time with a driving device in operation.

As shown in FIG. 10, by setting the alarm upper limit and the alarm lower limit on the basis of the data of the repeated energy values according to time in the driving period in the setting step (S30), it is possible to suspect deterioration, aging, abnormal load, etc. of the driving device due to long-time use and to induce stable operation of the facility through careful attention and management on the driving device when the energy change value according to time of the driving device exceeds the alarm upper limit or is less than the alarm lower limit even if the energy change value does not exceed the peak fault or the peak warning of the peak period or the mean fault or the mean warning of the mean period while the driving device is driven in real time.

Obviously, the alarm upper limit or the alarm lower limit is set on an energy value of the driving device that abnormally changes under situations such as deterioration, aging, and load due to sticking of foreign substance of the driving device.

Further, by setting the offset value, even if the driving device does not completely stop when it pauses, it is possible to forcibly extract a driving period of the driving device using the point, where the energy values of the driving device in the peak period and the mean period drop under the offset value, as an end point, so it is possible to easily perform preventive maintenance on the driving device having various driving conditions.

When the driving device pauses but does not completely stop, it is possible to set a driving period by setting an off duration such that a point, where the energy values of the driving device in the peak period and the mean period drop under the offset value and then are maintained for the off duration, can be recognized as the end point of the driving period.

Accordingly, since the preventive maintenance method 100 of a driving device according to the present invention can detect all the abnormal symptoms that may be generated before the driving device breaks and the abnormal symptoms that may be generated by deterioration or aging of the driving device, it is possible to more effectively prevent problems that may be generated by stoppage of a facility due to a breakdown of the driving device.

Further, a reset time is set in the setting step (S30).

The peak period and the mean period of the driving device are divided into several search periods by cutting the energy values in the peak period and the mean period at every set reset time.

Figure 11:
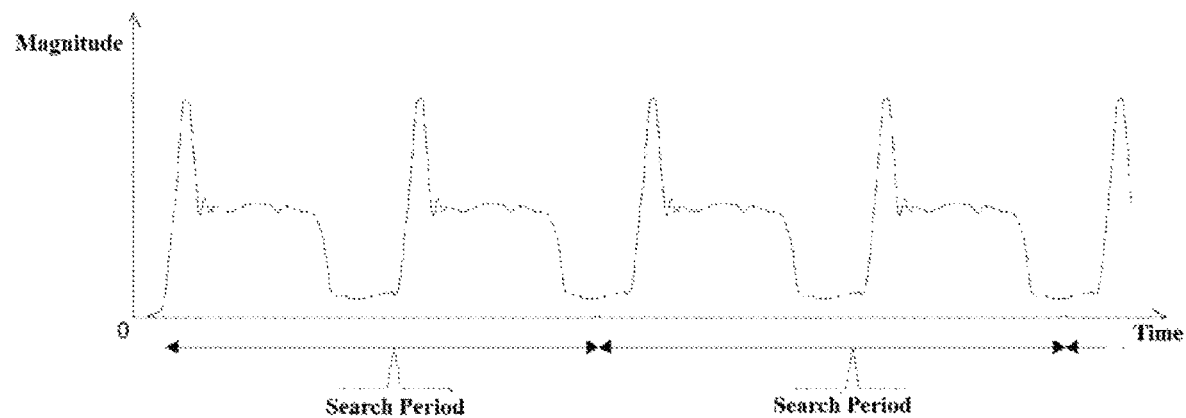
FIG. 11 is a graph illustrating that energy values of a driving device are divided into several search periods.

FIG. 11 is a graph illustrating that energy values of a driving device are divided into several search periods.

As shown in FIG. 11, since it is possible to extract and acquire several search periods by continuously cutting the energy values of the driving device in the peak period and the mean period at every reset time set in the setting step (S30), it is possible to more systematically collect, compare, and manage the states (data) of the driving device through the patterns of the repeated energy values in the search periods and it is also possible to more effectively perform preventive maintenance on the driving device on the basis of the data.

Accordingly, it is possible to more effectively perform preventive maintenance on the driving device on the basis of the energy value change information in the peak period and the mean period of the driving periods repeatedly extracted by the offset and the energy value change information in the search periods repeatedly extracted by the reset time.

Figure 12:
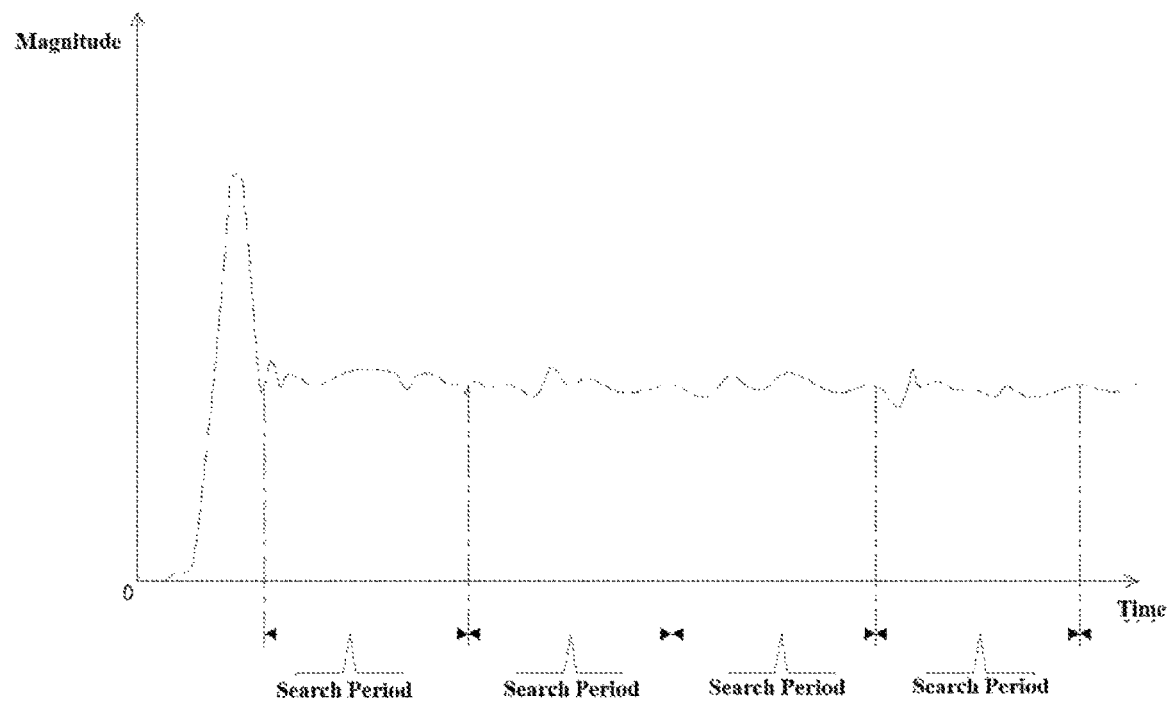
FIG. 12 is a graph illustrating that energy values of a driving device are divided into several search periods.

FIG. 12 is a graph illustrating that energy values of a driving device are divided into several search periods.

As shown in FIG. 12, when the driving device is continuously driven without pausing once it is driven, it is possible to extract and acquire several search periods by dividing the continuous mean period through the reset time, so the states of the driving device having a continuous mean period is effectively estimated through comparison of the several search periods by collecting and comparing information (data) collected from the several search periods.

Obviously, even though the driving device repeats driving and pausing, it is possible to effectively estimate the states of the driving device by comparing information of several search periods by applying the reset time.

The preventive maintenance method 100 of a driving device that detects abnormal symptoms of the driving device through the process described above, in accordance with an embodiment of the present invention, can prevent an enormous loss due to a breakdown of a driving device by collecting operation information of the driving device in a normal state and operation information of the driving device before a breakdown occurs, setting a fault and a warning in each of a peak period and a mean period on the basis of the collected information, and by comparing operation information collected in real time when the driving device is operated with the faults and the warnings in the peak period and the mean period to be able to repair and replace the driving device at appropriate time by giving a warning when a condition arising suspicion of abnormal symptoms of the driving device is satisfied.

Further, since the method proposes various detection conditions for search for various abnormal symptoms that may be generated in the driving device, and warns a user when the detection conditions are satisfied, it is possible to not only easily detect various abnormal symptoms that are generated in the driving device, but secure excellent reliability on the detection result.

Meanwhile, the preventive maintenance method 100 of a driving device according to an embodiment of the present invention can also be implemented by a combination of various electronic devices and programs that can collect, detect, compare, and warn of an energy value of the driving device.

Although the present invention was described with reference to the embodiments shown in the accompanying drawings, it is an example and is not limited to the embodiment described above, and it would be understood by those skilled in the art that various modified and equivalent embodiments may be implemented. Further, the present invention may be changed by those skilled in the art without departing from the spirit of the present invention. Accordingly, the scope of the present invention is not defined within the range of the detailed description, but may be limited to the claims to be described below and the spirit thereof.

S10. First base information collection step
S20. Second base information collection step
S30. Setting step
S40. Detection step
100. Preventive maintenance method of driving device

What is claimed is:

1. A preventive maintenance method of a driving device that is used for various facilities, the method comprising:
 a first base information collection step (S10) of collecting information about a change in energy magnitude according to time measured with the driving device in normal operation separately for each of a peak period and a mean period;
 a second base information collection step (S20) of collecting information about a change in energy magnitude according to time measured with the driving device in operation before the driving device breaks separately for each of the peak period and the mean period;
 a setting step (S30) of setting a peak fault of the peak period on the basis of the information collected in the first and second base information collection steps (S10 and S20); and
 a detection step (S40) of collecting information about a change in energy magnitude according to time measured in real time with the driving device in operation separately for each of the peak period and the mean period and of detecting the driving device in an abnormal state when the collected energy values in the peak period exceed the peak fault of the peak period set in the setting step (S30),
 wherein any one of a current that is consumed to drive the driving device, vibration that is generated when the driving device is driven, noise that is generated when the driving device is driven, and the frequency of a power supply source for the driving device is selected and used as the energy that is measured from the driving device, and
 in the setting step (S30), a period where the driving device starts to be driven is set as an exception period because a large change is generated in energy magnitude when the driving device starts to be driven, and
 in the detection step (S40), the driving device is recognized as being in a normal state even though the energy value of the driving device in the peak period exceeds the peak fault in the peak period in the exception period, and the driving device is recognized as being in an abnormal state even though it is the exception period when the energy value of the driving device in the peak period exceeds the peak fault in the peak period and a peak fault duration is maintained, in which the peak fault duration is set in the setting step (S30).

2. The method of claim 1, wherein
 a peak alarm period of a predetermined time is set in the setting step (S30), and
 in the detection step (S40), the number of times that the energy value of the driving device in the peak period exceeds the peak fault of the peak period in the set peak alarm period is counted, and when the number of times is sensed over a number of times set in the setting step (S30), the driving device is recognized as being in an abnormal state.

3. The method of claim 1, wherein
 in the setting step (S30), a peak warning of the peak period is set on the basis of the information collected in the first and second base information collection steps (S10 and S20), and the driving device is detected as in a warning state when the energy value of the driving device in the peak period exceeds the peak warning in the detection step (S40), when the energy value of the driving device exceeds the peak warning in the exception period, the driving device is detected as being in a normal state, when the energy value of the driving device exceeds the peak warning and a peak warning duration is maintained in the exception period, the driving device is recognized as being in a warning state even though it is the exception period, the peak warning of the peak period is set as a value smaller than the peak fault, and the peak warning duration is set in the setting step (S30).

4. The method of claim 1, wherein a mean fault of the mean period is set in the setting step (S30) on the basis of the information collected in the first and second base information collection steps (S10 and S20), in the detection step (S40), when the energy value of the driving device in the mean period exceeds the mean fault of the mean period set in the setting step (S30) and the exceeding energy value of the driving device in the mean period is not maintained for a mean fault duration, the driving device is detected as being in a normal state, but when the energy value of the driving device in the mean period is maintained for the mean fault duration, the driving device is detected as being in an abnormal state, and the mean fault duration is set in the setting step.

5. The method of claim 4, wherein a mean warning of the mean period is set in the setting step (S30) on the basis of the information collected in the first and second base information collection steps (S10 and S20), in the detection step (S40), when the energy value of the driving device in the mean period exceeds the mean warning of the mean period set in the setting step (S30) and the exceeding energy value of the driving device in the mean period is not maintained for a mean warning duration, the driving device is detected as being in a normal state, but when the energy value of the driving device in the mean period is maintained for the mean fault duration, the driving device is detected as being in a warning state, and the mean warning of the mean period is set as a value smaller than the mean fault of the mean period and the mean fault duration is set in the setting step (S30).

6. The method of claim 5, wherein when the energy value of the driving device in the peak period exceeds a peak warning of the peak period for a peak warning duration and the energy value in the mean period exceeds the mean warning of the mean period for the mean warning duration in the detection step (S40), the driving device is recognized as being in abnormal state.

7. The method of claim 5, wherein an offset value is set in the setting step (S30), a start point is set as a point where the energy values of the driving device start to exceeding the offset, an end point is set as a point where the energy values start to decreasing under the offset value, a driving period of the driving device is forcibly set as the period from the start point to the end point, driving periods repeated by the driving device that operates while repeating driving and pausing are respectively extracted and collected, average values of change values in energy magnitude of the driving device in the driving periods according to a measurement time in a normal state are extracted on the basis of information of the collected driving periods, and an alarm upper limit and an alarm lower limit are set on the basis of the extracted average values of the changes in energy magnitude of the driving device in the driving periods according to a measurement time, and in the detection step (S40), when a change value of an energy magnitude according to time measured in a real-time driving state of the driving device exceeds the alarm upper limit or is less than the alarm lower limit, the driving device is detected as being in an abnormal state.

8. The method of claim 7, wherein a reset time is set in the setting step (S30), and the peak period and the mean period of the driving device are divided into several search periods by cutting the energy values in the peak period and the mean period at every set reset time.

* * * * *